United States Patent
Gerbe et al.

(10) Patent No.: US 12,338,004 B2
(45) Date of Patent: Jun. 24, 2025

(54) ORBITAL DEPLOYMENT MODULE WITH A THREE-POINT SPACE PROPULSION SYSTEM

(71) Applicant: ARIANEGROUP SAS, Les Mureaux (FR)

(72) Inventors: Laurent Gerbe, Le Haillan (FR); Romain Delon, Le Haillan (FR)

(73) Assignee: ARIANEGROUP SAS, Les Mureaux (FR)

( * ) Notice: Subject to any disclaimer, the term of this patent is extended or adjusted under 35 U.S.C. 154(b) by 0 days.

(21) Appl. No.: 18/728,281

(22) PCT Filed: Jan. 10, 2023

(86) PCT No.: PCT/FR2023/050028
§ 371 (c)(1),
(2) Date: Jul. 11, 2024

(87) PCT Pub. No.: WO2023/135386
PCT Pub. Date: Jul. 20, 2023

(65) Prior Publication Data
US 2025/0083838 A1     Mar. 13, 2025

(30) Foreign Application Priority Data

Jan. 14, 2022   (FR) .................................... 2200279

(51) Int. Cl.
*B64G 1/24*     (2006.01)
*B64G 1/10*     (2006.01)
(Continued)

(52) U.S. Cl.
CPC ............... *B64G 1/245* (2023.08); *B64G 1/10* (2013.01); *B64G 1/26* (2013.01); *B64G 1/401* (2013.01); *B64G 1/4022* (2023.08); *B64G 1/641* (2013.01)

(58) Field of Classification Search
CPC . B64G 1/245; B64G 1/10; B64G 1/26; B64G 1/401; B64G 1/4022; B64G 1/641; B64G 1/2427
See application file for complete search history.

(56) References Cited

U.S. PATENT DOCUMENTS 3,231,223 A    1/1966   Upper
3,295,789 A    1/1967   Hill
(Continued)

FOREIGN PATENT DOCUMENTS

EP    2860115 A1    4/2015

OTHER PUBLICATIONS

Search Report and Written Opinion issued in International Application No. PCT/FR2023/050028, issued Apr. 3, 2023.
(Continued)

*Primary Examiner* — Valentina Xavier
(74) *Attorney, Agent, or Firm* — Bookoff McAndrews, PLLC

(57) ABSTRACT

A three-point propulsion system of an orbital deployment space module for at least one satellite including: chassis including exactly three first housings shaped to each receive a propulsion unit and at least one second housing shaped to receive a tank, at least one liquid fuel tank disposed in a second housing, and exactly three propulsion units, each propulsion unit being disposed in one of the first housings, and each propulsion unit including at least one thruster.

11 Claims, 2 Drawing Sheets

(51) Int. Cl.
*B64G 1/26* (2006.01)
*B64G 1/40* (2006.01)
*B64G 1/64* (2006.01)

(56) References Cited

U.S. PATENT DOCUMENTS

| | | | |
|---|---|---|---|
| 11,827,385 B2* | 11/2023 | Harleman, Jr. | ........ B64G 1/641 |
| 2015/0083865 A1 | 3/2015 | Nakasone | |
| 2017/0036782 A1* | 2/2017 | Dula | ...................... B64G 1/402 |

OTHER PUBLICATIONS

Search Report issued in priority application No. FR902509, issued Aug. 12, 2022.

* cited by examiner

[Fig. 1]
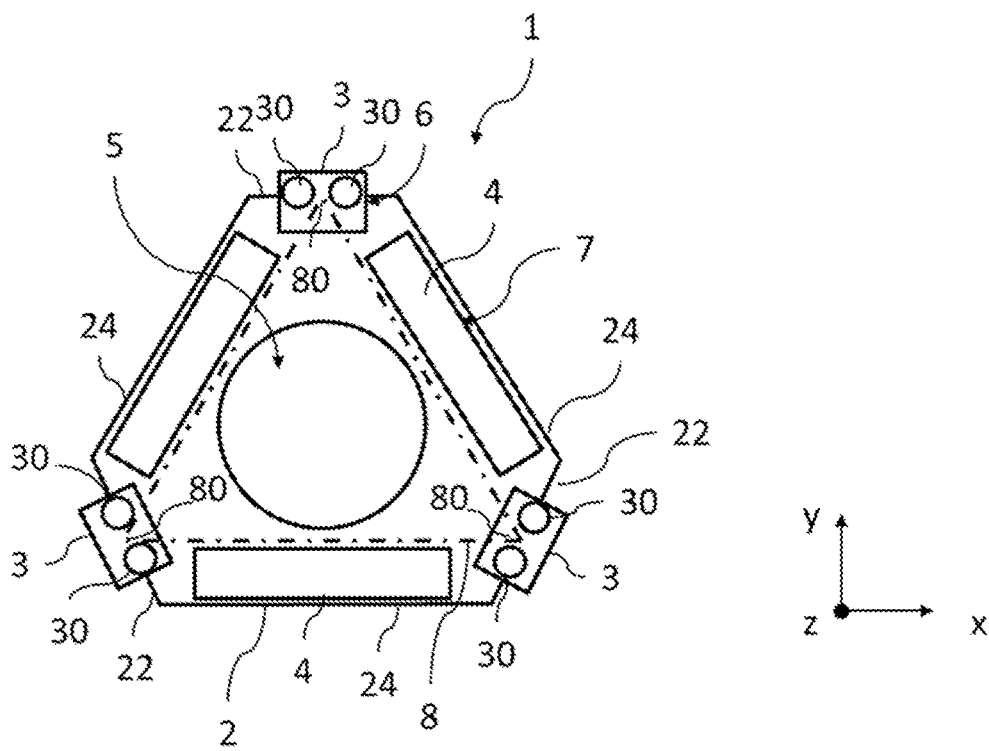
[Fig. 2]
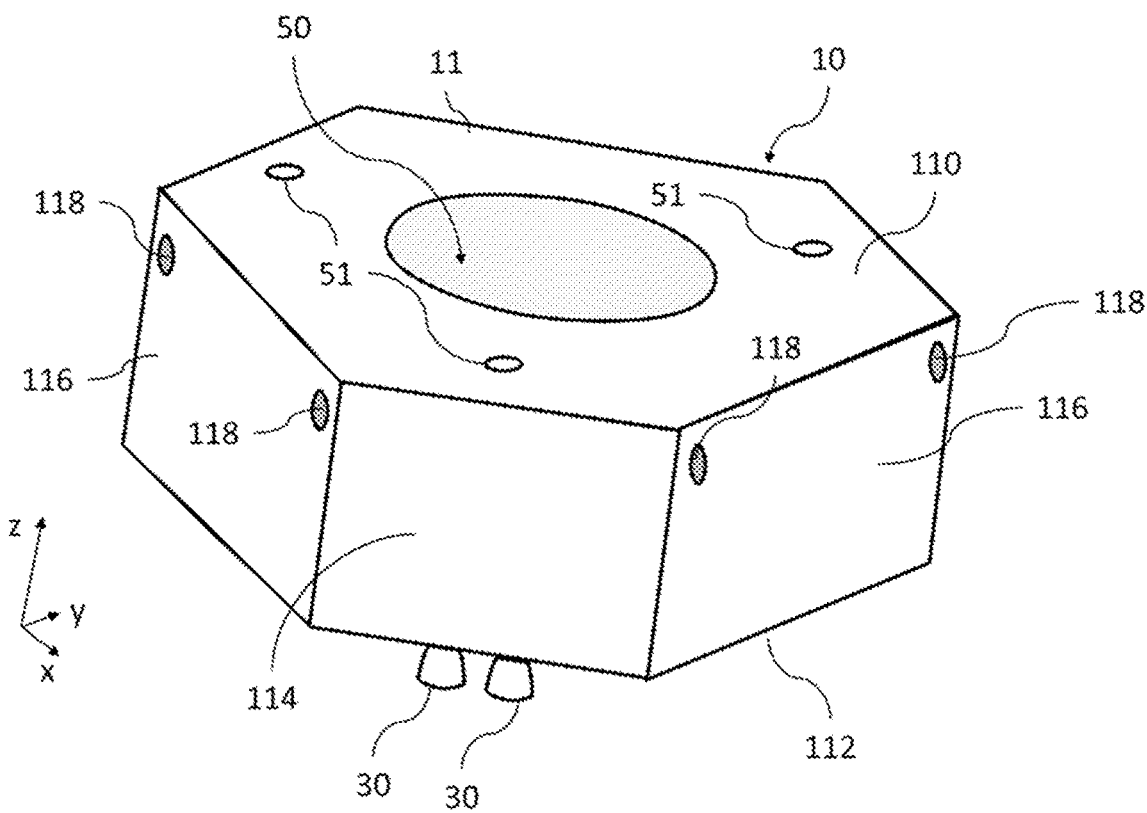

[Fig. 3]
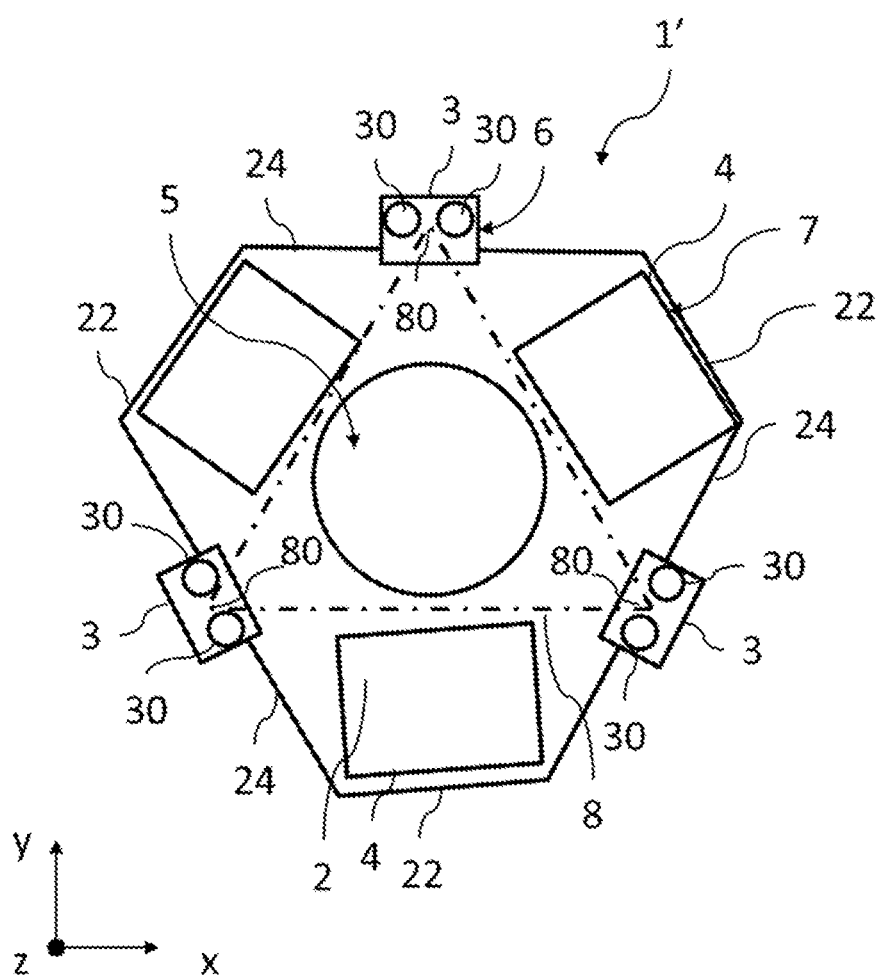

ORBITAL DEPLOYMENT MODULE WITH A THREE-POINT SPACE PROPULSION SYSTEM

CROSS-REFERENCE TO RELATED APPLICATIONS

This is a National Stage Application under 35 U.S.C. § 371 of International Application No. PCT/FR2023/050028, filed Jan. 10, 2023, now published as WO 2023/135386 A1, which claims priority to French Patent Application No. 2200279, filed on Jan. 14, 2022.

TECHNICAL FIELD

The invention relates to the technical field of space propulsion systems and more particularly to the architecture of a propulsion system for an orbital deployment module.

PRIOR ART

In the field of aerospace transport and in other fields, those skilled in the art continually seek to improve the operation of their devices, in particular to simplify the physical elements which constitute them and reduce their production costs.

Generally, space propulsion systems for orbital deployment modules, such as satellites or modules carrying satellites, use as main propulsion vector either an architecture based on a plurality of fixed thrusters distributed over two or four points, or an architecture based on steerable thrusters and a system for controlling the orientation.

In architecture with fixed thrusters, four propulsion points distributed across the four corners of a square or rectangle depending on the distribution of the load on the orbital deployment module, are generally used. This type of architecture has the advantage of having a simplified control, and therefore a simplified software control architecture. This architecture effectively makes it possible to control the thrusters based on sending propulsion pulses on the thrusters with the possibility of decorrelating the propulsion along each of the two axes of an orthogonal reference frame defined by the arrangement of the four propulsion points.

Even if the control is simplified, this architecture is not optimal to ensure the main function which is to move the deployment module in a precise direction orthogonal to the propulsion plan in which the thrusters are distributed over the four propulsion points.

Disclosure Of The Invention

The main aim of the present invention is therefore to provide an orbital deployment space module equipped with a propulsion system whose bulk and cost, apart from the tanks, are reduced, the space saved can be intended to increase the capacity of the tanks or the housing intended to receive one or several satellites.

According to one object of the invention, there is proposed a propulsion system with three propulsion points of an orbital deployment space module for at least one satellite comprising:

a chassis including exactly three first housings shaped to each receive a propulsion unit and at least a second housing shaped to receive a tank,
at least one liquid fuel tank disposed in a second housing,
exactly three propulsion units, each propulsion unit being disposed in one of the first housings, and each propulsion unit including at least one thruster, and
a control unit configured to control the supply and the power developed by each of the propulsion units.

A three-point propulsion system allows greatly reducing the bulk and costs compared to a four-point propulsion system. However, this reduction is not obvious because it forces the use of propulsion control logic completely different from that of a four-point propulsion system. In particular, the pitch drive function is coupled with the yaw drive function in the control logic. This bulk and cost reduction is only possible with a more complex propulsion unit monitoring control.

In a first embodiment of the propulsion system, the three first housings can each be disposed at a vertex of the same triangle whose center of gravity corresponds to the center of gravity of the propulsion system.

An arrangement of the propulsion units balanced relative to the center of gravity of the propulsion system makes it possible to simplify the control of the propulsion units.

Preferably, the three first housings are each disposed at a vertex of the same equilateral triangle.

The use of a balanced arrangement offered by an equilateral triangle makes it possible to further simplify the control of the propulsion units.

In a second embodiment of the propulsion system, the propulsion units can include the same number of thrusters, and preferably identical thrusters.

Having identical propulsion units makes it possible to simplify even further the control of the propulsion units.

In a third embodiment of the propulsion system, the chassis may have a shape, in a cutting plane comprising the three propulsion units, with a number of sides equal to a multiple of the number 3.

Such a geometric shape of the chassis of the propulsion system makes it possible to optimize the shape of the orbital space module equipped with such a propulsion system relative to the space allocated by said space module.

In a fourth embodiment of the propulsion system, the chassis may have a hexagonal shape in a cutting plane comprising the three propulsion units.

In a fifth embodiment of the propulsion system, the chassis can further comprise a central housing shaped to receive at least one satellite intended to be put into orbit.

In a sixth embodiment of the propulsion system, the chassis can comprise a removable connection interface to receive at least one satellite intended to be put into orbit.

In a seventh embodiment of the propulsion system, each thruster can be oriented parallel to a main propulsion direction which is perpendicular to a plane comprising the three propulsion units, and the propulsion system further comprises an auxiliary propulsion system including auxiliary thrusters oriented in a direction perpendicular to the main propulsion direction.

The auxiliary propulsion system makes it possible in particular to generate propulsion in a tangential direction, in particular to rotate the propulsion system, and therefore the space module equipped with this propulsion system, about its main axis which corresponds to the main propulsion axis of the propulsion system.

This rotation of the propulsion system about itself, and therefore of the space module equipped with such a propulsion system, makes it possible to stabilize the temperature of the space module.

In one embodiment of the propulsion system, the control unit can be configured to determine, at each movement of the propulsion system, the thrust that each of said three propulsion units must develop for the desired movement.

Preferably, the control unit comprises positioning sensors such as for example a stellar sighting sensor or for example a global positioning system (GPS).

Preferably, the control unit comprises a chopping unit configured to control the propulsion torque by chopping the supply to the propulsion units with a chopping duration calculated for each of the propulsion units.

The use of a chopped control of the propulsion units makes it possible to limit the temperature rise of the thrusters compared to a continuous operation of the propulsion units.

According to another object of the invention, there is proposed an orbital deployment space module for at least one satellite comprising an enclosure configured to transport at least one satellite to be put in space orbit, and a propulsion system with three propulsion points as defined above.

BRIEF DESCRIPTION OF THE DRAWINGS

Other characteristics and advantages of the present invention will emerge from the description given below, with reference to the appended drawings which illustrate one exemplary embodiment without any limitation.

FIG. 1 schematically represents a sectional view of a propulsion system of an orbital deployment space module according to a first embodiment of the invention.

FIG. 2 schematically represents a perspective view of an orbital deployment space module according to one embodiment of the invention.

FIG. 3 schematically represents a sectional view of a propulsion system of an orbital deployment space module according to a second embodiment of the invention.

DESCRIPTION OF THE EMBODIMENTS

FIG. 1 schematically represents a sectional view of a propulsion system of an orbital deployment space module according to one embodiment of the invention.

The propulsion system 1 comprises a chassis 2, three main propulsion units 3, and three fuel tanks 4. The cutting plane of FIG. 1 cuts the three propulsion units 3, and comprises a first direction x and a second direction y orthogonal to the first direction x. The cutting plane xy is orthogonal to a third direction z parallel to the main propulsion direction of the propulsion system 1.

The chassis 2 includes a central housing 5 intended to receive one or several satellites (not represented in FIG. 1) intended to be put in orbit by an orbital deployment space module equipped with said propulsion system 1. The chassis 2 further includes three first housings 6 shaped to each receive a main propulsion unit 3, and three second housings 7 shaped to each receive a fuel tank 4.

Each main propulsion unit 3 is disposed at the vertex of an equilateral triangle 8 represented in phantom lines. The propulsion system thus forms a three-point propulsion system.

Furthermore, in the embodiment illustrated in FIG. 1, each main propulsion unit 3 comprises two thrusters 30. In one variant, each main propulsion unit 3 can comprise a single thruster 30 or at least three thrusters 30. In another variant, the propulsion units 3 can comprise a different number of thrusters.

The thrusters 30 of a propulsion unit can be of the same type or of different types. The thrusters 30 can be for example gas ejection nozzles, or electric or ion thrusters.

In the embodiment illustrated in FIG. 1, the chassis 2 comprises a hexagonal shape with three first sides 22 and three second sides 24, the length of a second side 24 being greater than the length of a first side 22, and each first side 22 being adjacent to two distinct second sides 24. In other words, each first side 22 is separated from the two other first sides 22 by two second sides 24.

Each main propulsion unit 3 is mounted on a first side 22, while each tank 4 extends along a second side 24 between two main propulsion units 3, on the one hand, and between a second side 24 and the central housing 5, on the other hand.

The tanks 4 can have any possible shape.

In one variant illustrated in FIG. 3, each main propulsion unit 3 can be mounted on a second side 24, the three main propulsion units 3 being disposed at the vertex of a triangle whose geometric center of gravity corresponds to the center of gravity of the propulsion system 1.

FIG. 2 schematically represents a perspective view of an orbital deployment space module 10 equipped with the propulsion system 1 of FIG. 1.

The module 10 comprises an enclosure 11 having a hexagonal shape in the plane xy corresponding to the hexagonal shape of the chassis 2 of the propulsion system 1 of FIG. 1. The enclosure 11 comprises an upper face 110, a lower face 112, three first side faces 114 and three second side faces 116, the three second side faces being longer than the three first side faces 114.

The upper face 110 comprises a recess 50 communicating with the central housing 5 of the chassis 2 of the propulsion system 1 of FIG. 1.

Furthermore, each second side face 116 comprises two orifices 118 each located in the vicinity of a first side face 114. The propulsion system 1 further comprises auxiliary thrusters. Each auxiliary thruster is mounted on the chassis 2 facing an orifice 118 of the enclosure 11 of the space module 10. The auxiliary thrusters allow monitored rotation of the space module 1 about its main axis which is parallel to the third direction z. This rotation of the space module 1 makes it possible to homogenize the temperature of the orbital deployment space module 1.

Preferably, the auxiliary thrusters of the same second side face are oriented in opposite directions, the one being used to initiate a rotation in one direction and the other being used to initiate a rotation in the opposite direction or cancel the current rotation.

The invention thus makes it possible to provide an orbital deployment space module equipped with a propulsion system whose bulk and cost, apart from the tanks, are reduced, the space saved can be intended to increase the capacity of the tanks or the housings intended to receive one or several satellites.

The invention claimed is:

1. A propulsion system with three propulsion points of an orbital deployment space module for at least one satellite comprising:
   a chassis including exactly three first housings shaped to each receive a propulsion unit and at least a second housing shaped to receive a tank,
   at least one liquid fuel tank disposed in a second housing,
   exactly three propulsion units, each propulsion unit being disposed in one of the first housings, and each propulsion unit including at least one thruster,
   a central housing shaped to receive a satellite intended to be put into orbit, and a control unit configured to control the supply and the power developed by each of the propulsion units and with a control logic coupling a pitch drive function and a yaw drive function.

2. The propulsion system according to claim 1, wherein the three first housings are each disposed at a vertex of the same triangle whose center of gravity corresponds to the center of gravity of the propulsion system.

3. The propulsion system according to claim 2, wherein the three first housings are each disposed at a vertex of the same equilateral triangle.

4. The propulsion system according to claim 1, wherein the propulsion units include the same number of thrusters.

5. The propulsion system according to claim 1, wherein the chassis has a shape, in a cutting plane comprising the three propulsion units, with a number of sides equal to a multiple of the number 3.

6. The propulsion system according to claim 1, wherein the chassis has a hexagonal shape in a cutting plane comprising the three propulsion units.

7. The propulsion system according to claim 1, wherein the chassis further comprises a removable connection interface to receive a satellite intended to be put into orbit.

8. The propulsion system according to claim 1, wherein each thruster is oriented parallel to a main propulsion direction which is perpendicular to a plane comprising the three propulsion units, and the propulsion system further comprises an auxiliary propulsion system including auxiliary thrusters oriented in a direction perpendicular to the main propulsion direction.

9. The propulsion system according to claim 1, wherein the control unit is configured to determine, at each movement of the propulsion system, the thrust that each of said three propulsion units must develop for the desired movement.

10. The propulsion system according to claim 1, wherein the control unit comprises a chopping unit configured to control the propulsion torque by chopping the supply to the propulsion units with a chopping duration calculated for each of the propulsion units.

11. An orbital deployment space module for at least one satellite comprising an enclosure configured to transport at least one satellite to be put in space orbit, and a three-point propulsion system according to claim 1.

* * * * *